(12) United States Patent
Hsiao et al.

(10) Patent No.: US 12,535,633 B2
(45) Date of Patent: Jan. 27, 2026

(54) DISPLAY APPARATUS

(71) Applicant: CHAMP VISION DISPLAY INC., Miao-Li County (TW)

(72) Inventors: Chun-Chung Hsiao, Miao-Li County (TW); Wei-Jhe Chien, Miao-Li County (TW); Hsin-Hung Lee, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 0 days.

(21) Appl. No.: 18/908,707

(22) Filed: Oct. 7, 2024

(65) Prior Publication Data

US 2025/0123438 A1    Apr. 17, 2025

(30) Foreign Application Priority Data

Oct. 13, 2023    (CN) .......................... 202311325752.0

(51) Int. Cl.
    *F21V 8/00*    (2006.01)

(52) U.S. Cl.
    CPC ......... *G02B 6/0036* (2013.01); *G02B 6/0068* (2013.01)

(58) Field of Classification Search
    CPC .......................... G02B 6/0036; G02B 6/0068
    See application file for complete search history.

(56) References Cited

U.S. PATENT DOCUMENTS

2003/0227768 A1 * 12/2003 Hara .................... G02B 6/0068
    362/613
2007/0008456 A1    1/2007 Lesage et al.
(Continued)

FOREIGN PATENT DOCUMENTS

CN    116626802    8/2023
TW    201344307    11/2013
(Continued)

OTHER PUBLICATIONS

Chung-Hao Wu et al., "Light Source Module and Display Apparatus", Unpublished U.S. Appl. No. 18/955,894, filed Nov. 21, 2024, The specification, claims, and the drawings of the unpublished pending U.S. application have been stored in the Image File Wrapper (IFW) system.

(Continued)

*Primary Examiner* — Christopher E Dunay
(74) *Attorney, Agent, or Firm* — JCIPRNET (57) ABSTRACT

A display apparatus includes a light guide plate, a first light source, a second light source, multiple first optical microstructures, multiple second optical microstructures, and a display panel. The first light source and the second light source are disposed beside a first light incident surface and a second light incident surface of the light guide plate respectively. Multiple second light beams emitted from the second light source irradiate a display surface of the display panel after being reflected by multiple second light receiving surfaces of the second optical microstructures disposed on a second light emitting surface of the light guide plate. Multiple first light beams emitted from the first light source exit the display apparatus after being reflected by multiple first light receiving surfaces of the first optical microstructures disposed on a first light emitting surface of the light guide plate.

10 Claims, 9 Drawing Sheets

(56) References Cited

U.S. PATENT DOCUMENTS

| | | | |
|---|---|---|---|
| 2019/0227222 A1* | 7/2019 | Zhu | G02B 6/0076 |
| 2020/0233142 A1* | 7/2020 | Liao | G02B 6/0068 |
| 2024/0036390 A1* | 2/2024 | Hai | G02B 6/0055 |
| 2024/0192434 A1 | 6/2024 | Lee et al. | |
| 2024/0201432 A1* | 6/2024 | Liu | G02B 6/0068 |
| 2025/0076560 A1* | 3/2025 | Liu | G02B 6/0036 |
| 2025/0184469 A1* | 6/2025 | Wu | H04N 13/351 |

FOREIGN PATENT DOCUMENTS

| | | |
|---|---|---|
| TW | I480634 | 4/2015 |
| TW | 201629592 | 8/2016 |
| TW | M595237 | 5/2020 |
| TW | M623305 | 2/2022 |
| TW | M624394 | 3/2022 |
| TW | M628809 | 6/2022 |
| TW | 202303034 | 1/2023 |
| TW | M639487 | 4/2023 |

OTHER PUBLICATIONS

"Office Action of Taiwan Related Application, Application No. 112146751", issued on Oct. 9, 2024, p. 1-p. 8.

* cited by examiner

DISPLAY APPARATUS

CROSS-REFERENCE TO RELATED APPLICATION

This application claims the priority benefit of China application serial no. 202311325752.0, filed on Oct. 13, 2023. The entirety of the above-mentioned patent application is hereby incorporated by reference herein and made a part of this specification.

BACKGROUND

Technical Field

The disclosure relates to a display apparatus, and in particular, to a display apparatus with an anti-peep function.

Related Art

Reflective display apparatuses have gradually attracted attention due to their advantages of low energy consumption and high outdoor visibility, and their applications in readers and commercial displays (such as advertising billboards, electronic labels, sports watches, etc.) are increasing year by year, for example. In order to maintain display quality when ambient light is insufficient, a reflective display apparatus equipped with a front light source is proposed. On the other hand, in order to meet the anti-peep requirements of reflective display apparatuses, the current practice is to add an additional anti-peep film to the display apparatus. However, in order to simultaneously meet the illumination needs of the front light source and the anti-peep requirements of the display screen, the overall thickness of the reflective display apparatus will inevitably increase, and it is also more difficult to take into account the anti-peep effect and the illumination effects at the same time.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a display apparatus with an anti-peep function. The overall appearance of the apparatus is relatively light and thin, and the display quality is also improved.

Other objects and advantages of the disclosure may be further understood from the technical features disclosed in the disclosure.

In order to achieve one, part, or all of the above objects or other objects, an embodiment of the disclosure provides a display apparatus. The display apparatus includes a light guide plate, a first light source, a second light source, a plurality of first optical microstructures, a plurality of second optical microstructures, and a display panel. The light guide plate has a first light incident surface, a second light incident surface, a first light emitting surface, and a second light emitting surface. The first light incident surface is connected to the second light incident surface, the first light emitting surface, and the second light emitting surface. The first light emitting surface faces away from the second light emitting surface. The first light source is disposed on a side of the first light incident surface of the light guide plate and emits a plurality of first light beams toward the first light incident surface. The first light beams enter the light guide plate through the first light incident surface. The second light source is disposed on a side of the second light incident surface of the light guide plate and emits a plurality of second light beams toward the second light incident surface. The second light beams enter the light guide plate through the second light incident surface. The first optical microstructures are disposed on the first light emitting surface of the light guide plate and each has a first light receiving surface facing the first light source. The second optical microstructures are disposed on the second light emitting surface of the light guide plate and each has a second light receiving surface facing the second light source. The display panel is disposed on a side of the first light emitting surface of the light guide plate and overlaps the first light emitting surface. The second light beams pass through the first light emitting surface and irradiate a display surface of the display panel after being reflected by the second light receiving surfaces of the second optical microstructures. The first light beams pass through the second light emitting surface and exit the display apparatus after being reflected by the first light receiving surfaces of the first optical microstructures.

Based on the above, in the display apparatus according to an embodiment of the disclosure, the light guide plate has the first light emitting surface and the second light emitting surface that face away from each other. The display panel is provided on the side of the first light emitting surface of the light guide plate. The second optical microstructures disposed on the second light emitting surface reflect the second light beams entering the light guide plate through the second light incident surface such that they pass through the first light emitting surface and irradiate the display surface of the display panel to serve as a light source of illumination when the display apparatus displays. The first optical microstructures disposed on the first light emitting surface reflect the first light beams entering the light guide plate through the first light incident surface such that they pass through the second light emitting surface and are projected within a specific angle range in the use space to serve as an interference light source during the anti-peep display of the display apparatus. By integrating the optical microstructures with these two functions on the same light guide plate, in addition to significantly reducing the overall thickness of the display apparatus, it can also prevent the display efficiency of the display apparatus from being reduced due to the addition of extra light guide plates.

Although the disclosure has been described above through embodiments, they are not intended to limit the disclosure. Anyone with ordinary knowledge in the art may make changes and modifications without departing from the spirit and scope of the disclosure. Thus, the protection scope of the disclosure shall be determined by the claims.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Thus, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
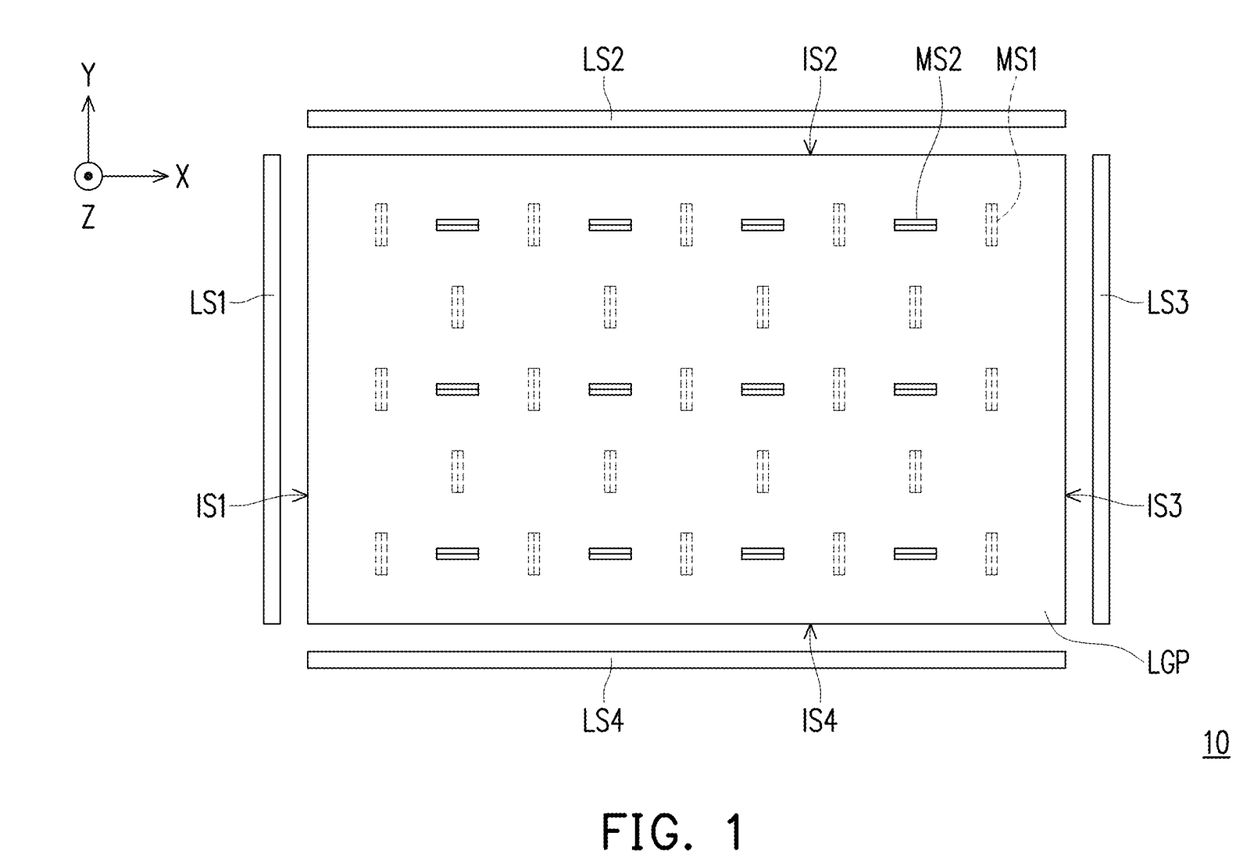
FIG. 1 is a schematic front view of a display apparatus according to a first embodiment of the disclosure.
Figure 2A:
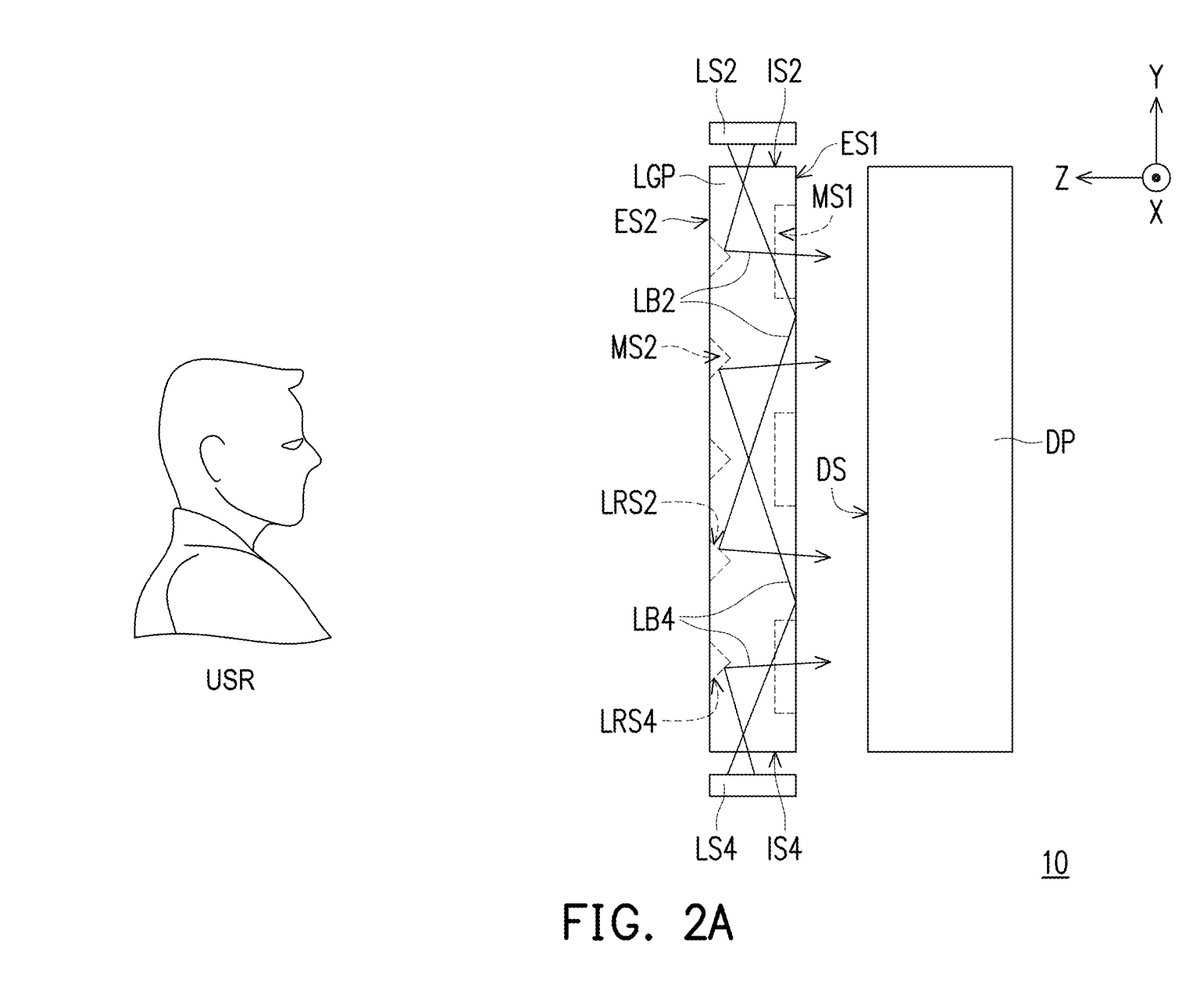
FIG. 2A and FIG. 2B are schematic side views of the display apparatus of FIG. 1.
Figure 2B:
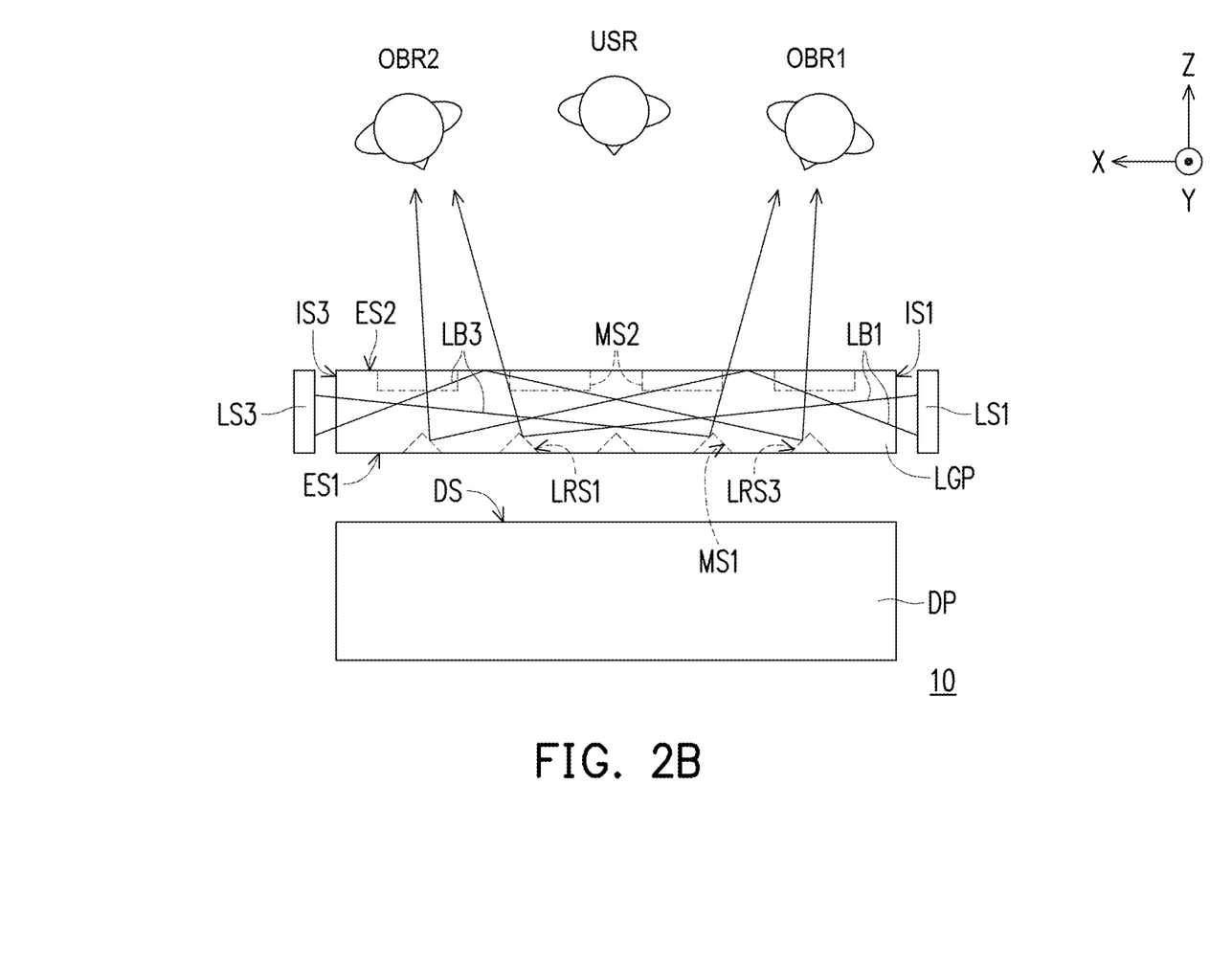

FIG. 1 is a schematic front view of a display apparatus according to a first embodiment of the disclosure. FIG. 2A and FIG. 2B are schematic side views of the display apparatus of FIG. 1. Refer to FIG. 1, FIG. 2A, and FIG. 2B. A display apparatus 10 includes a light guide plate LGP, a first light source LS1, a second light source LS2, a plurality of first optical microstructures MS1, a plurality of second optical microstructures MS2, and a display panel DP. The light guide plate LGP has a first light incident surface IS1, a second light incident surface IS2, a first light emitting surface ES1, and a second light emitting surface ES2. The first light incident surface IS1 is connected to the second light incident surface IS2, the first light emitting surface ES1, and the second light emitting surface ES2. The first light emitting surface ES1 faces away from the second light emitting surface ES2. In this embodiment, the first light incident surface IS1 may be selectively perpendicular to the second light incident surface IS2, but the disclosure is not limited thereto. It should be understood that the arrangement and relative positional relationship between the first optical microstructures MS1 and the second optical microstructures MS2 in FIG. 1, FIG. 2A, and FIG. 2B are only for schematic illustration and are not intended to be limiting, and there is not necessarily a direct correspondence between the drawings.

The first light source LS1 is disposed on a side of the first light incident surface IS1 of the light guide plate LGP and emits a plurality of first light beams LB1 toward the first light incident surface IS1. The first light beams LB1 enter the light guide plate LGP through the first light incident surface IS1. The second light source LS2 is disposed on a side of the second light incident surface IS2 of the light guide plate LGP and emits a plurality of second light beams LB2 toward the second light incident surface IS2. The second light beams LB2 enter the light guide plate LGP through the second light incident surface IS2. In this embodiment, the first light source LS1 and the second light source LS2 may be a linear light source respectively, for example, a light bar having a plurality of light emitting device, but the disclosure is not limited thereto.

In this embodiment, for example, the horizontal field of view of a user USR is distributed along a direction X, and the vertical field of view is distributed along a direction Y. It is particularly noted that the first light incident surface IS1 of the light guide plate LGP is located on a side of the light guide plate LGP along the direction X, and the second light incident surface IS2 is located on a side of the light guide plate LGP along the direction Y.

In this embodiment, the first light emitting surface ES1 of the light guide plate LGP faces a display surface DS of the display panel DP, and overlaps the display surface DS along a normal direction of the display surface DS (e.g. direction Z). That is, the display panel DP is disposed on a side of the first light emitting surface ES1 of the light guide plate LGP, and the second light emitting surface ES2 faces away from the display panel DP. In this embodiment, the display panel DP is, for example, a reflective display panel or a transflective display panel, but the disclosure is not limited thereto. In other embodiments, the display panel DP generally refers to other types of displays used for display.

It is particularly noteworthy that the first light emitting surface ES1 of the light guide plate LGP is provided with the first optical microstructures MS1 that are disposed corresponding to the first light source LS1, and the second light emitting surface ES2 is provided with the second optical microstructures MS2 that are disposed corresponding to the second light source LS2.

More specifically, each of the first optical microstructures MS1 has a first light receiving surface LRS1 facing the first light source LS1, and the first light beams LB1 transmitted in the light guide plate LGP may pass through the second light emitting surface ES2 and exit the display apparatus 10 after being reflected by the first light receiving surfaces LRS1 of the first optical microstructures MS1. Each of the second optical microstructures MS2 has a second light receiving surface LRS2 facing the second light source LS2, and the second light beams LB2 transmitted in the light guide plate LGP may pass through the first light emitting surface ES1 and irradiate the display surface DS of the display panel DP after being reflected by the second light receiving surfaces LRS2 of the second optical microstructures MS2.

In this embodiment, the display apparatus 10 mainly uses an ambient light source as a light source of illumination during display, and for example, the ambient light passes through the light guide plate LGP from a side of the second light emitting surface ES2 of the light guide plate LGP and irradiates the display surface DS of the display panel DP. When the ambient light is sufficient, the second light source LS2 may be turned off. On the contrary, when the ambient light of the use area is insufficient, the second light source LS2 may be turned on as an auxiliary or main light source of illumination of the display panel DP, and the second optical microstructures MS2 on the light guide plate LGP guide the second light beams LB2 emitted by the second light source LS2 and transmitted through the light guide plate LGP to the display surface DS of the display panel DP (as shown in FIG. 2A) for illumination.

On the other hand, the user USR may switch the display apparatus 10 between a sharing mode and an anti-peep mode through the switch of the first light source LS1. For example, when the first light source LS1 is turned on to emit the first light beams LB1, the first optical microstructures MS1 on the light guide plate LGP guide the first light beams LB1 transmitted through the light guide plate LGP to a space outside the user USR, such as the location of a bystander OBR1 or a bystander OBR2 in FIG. 2B (such as shown in FIG. 2B). Thus, both the bystander OBR1 and the bystander OBR2 may see the first light beams LB1 emitted by the first light source LS1.

For example, the first light source LS1 may be a white light source. For the bystanders OBR1 and OBR2, when the first light source LS1 is turned on, the first light beams LB1 will form a bright white screen overlapping the display surface DS of the display panel DP. The brightness of this bright white screen may be higher than the display brightness of the image screen of the display panel DP. Thus, after the image screen of the display panel DP is superimposed with this bright white screen, it cannot be clearly seen by the bystanders, thus achieving the anti-peep effect. Since the first light beams LB1 emitted by the first light source LS1 are not directed to the user USR, the user USR may still clearly see the image screen of the display panel DP.

On the contrary, when the user USR intends to operate the display apparatus 10 in the sharing mode, the first light source LS1 may be turned off. At this time, the bystanders OBR1 and OBR2 are no longer disturbed by the bright white screen produced by the first light source LS1 and the first optical microstructures MS1 on the light guide plate LGP, so they may clearly see the image screen of the display panel DP.

In this embodiment, the cooperation between the first light source LS1 and the first optical microstructures MS1 on the light guide plate LGP allows the display apparatus 10 to have an anti-peep function, and the cooperation between the second light source LS2 and the second optical microstructures MS2 on the light guide plate LGP allows the display apparatus 10 to have a function of front light illumination. By integrating two optical microstructures corresponding to different functions on the same light guide plate LGP, the overall thickness of the display apparatus 10 can be greatly reduced. Since the two optical microstructures do not need to be disposed on two separate light guide plates, the display efficiency (such as the transmittance of ambient light or auxiliary light) of the display apparatus 10 can be prevented from being reduced due to the addition of additional light guide plates.

In order to further improve the anti-peep effect, the display apparatus 10 may further selectively include a third light source LS3 disposed on a side of a third light incident surface IS3 of the light guide plate LGP. In this embodiment, the third light incident surface IS3 is connected to the second light incident surface IS2 and is opposite to the first light incident surface IS1. More specifically, the first light incident surface IS1 and the third light incident surface IS3 are respectively located on opposite sides of the light guide plate LGP along the direction X.

The third light source LS3 emits a plurality of third light beams LB3 toward the third light incident surface IS3. The third light beams LB3 enter the light guide plate LGP through the third light incident surface IS3. Each of the first optical microstructures MS1 on the first light emitting surface ES1 of the light guide plate LGP further has a third light receiving surface LRS3 facing the third light source LS3, and the third light beams LB3 transmitted in the light guide plate LGP may pass through the second light emitting surface ES2 and exit the display apparatus 10 after being reflected by the third light receiving surfaces LRS3 of the first optical microstructures MS1.

For example, when the third light source LS3 is turned on to emit the third light beams LB3, the first optical microstructures MS1 on the light guide plate LGP guide the third light beams LB3 transmitted through the light guide plate LGP to a space outside the user USR, such as the location of the bystander OBR1 or the bystander OBR2 in FIG. 2B. Thus, both the bystander OBR1 and the bystander OBR2 may see the third light beams LB3 emitted by the third light source LS3.

When the first light source LS1 and the third light source LS3 are turned on at the same time, the brightness of the bright white screen seen by the bystanders facing the display surface DS of the display panel DP can be further enhanced, thereby improving the anti-peep effect of the display apparatus 10. Since the third light beams LB3 emitted by the third light source LS3, like the first light beams LB1, are not directed to the user USR, the user USR may still clearly see the image screen of the display panel DP.

It should be noted that, although not shown in FIG. 2B, it is understandable that the first light beams LB1 may also be directed to the bystander OBR1 after being reflected by the first light receiving surfaces LRS1 of the first optical microstructures MS1, and the third light beams LB3 may also be directed to the bystander OBR2 after being reflected by the third light receiving surfaces LRS3 of the first optical microstructures MS1. That is, which side of the user USR the light beams emitted by the first light source LS1 or the third light source LS3 are directed to after being reflected by the first optical microstructures may be determined by adjusting the design of the light receiving surfaces of the first optical microstructures, and is not limited in the disclosure. It should be understood that the first light receiving surface LRS1 of each of the first optical microstructures MS1 is located between the first light incident surface IS1 and the third light receiving surface LRS3, and the third light receiving surface LRS3 of each of the first optical microstructures MS1 is located between the third light incident surface IS3 and the first light receiving surface LRS1, wherein the term "light receiving" is only used to indicate the direction in which the structure faces the light incident surface and the light source, and is not used to limit its optical effect.

On the other hand, in order to further improve the effect of front light illumination, the display apparatus 10 may further include a fourth light source LS4 disposed on a side of a fourth light incident surface IS4 of the light guide plate LGP. In this embodiment, the fourth light incident surface IS4 is connected to the first light incident surface IS1 and the third light incident surface IS3, and is opposite to the second light incident surface IS2. More specifically, the second light incident surface IS2 and the fourth light incident surface IS4 are respectively located on opposite sides of the light guide plate LGP along the direction Y.

The fourth light source LS4 emits a plurality of fourth light beams LB4 toward the fourth light incident surface IS4. The fourth light beams LB4 enter the light guide plate LGP through the fourth light incident surface IS4. Each of the second optical microstructures MS2 on the second light emitting surface ES2 of the light guide plate LGP further has a fourth light receiving surface LRS4 facing the fourth light source LS4, and the fourth light beams LB4 transmitted in the light guide plate LGP may pass through the first light emitting surface ES1 and irradiate the display surface DS of the display panel DP (As shown in FIG. 2A) after being reflected by the fourth light receiving surfaces LRS4 of the second optical microstructures MS2. That is, the fourth light source LS4, like the second light source LS2, may be used as the auxiliary light source or the main light source of the display apparatus 10 when the ambient light is insufficient.

For example, the user USR may choose to turn on one light source (such as the second light source LS2 or the fourth light source LS4) or two light sources (such as the second light source LS2 and the fourth light source LS4) according to the ambient light status of the use area to meet the illumination needs of the display apparatus 10 during display. It should be understood that the second light receiving surface LRS2 of each of the second optical microstructures MS2 is located between the second light incident surface IS1 and the fourth light receiving surface LRS4, and the fourth light receiving surface LRS4 of each of the second optical microstructures MS2 is located between the fourth light incident surface IS4 and the second light receiving surface LRS2, wherein the term "light receiving" is only used to indicate the direction in which the structure faces the light incident surface and the light source, and is not used to limit its optical effect.

Other embodiments will be given below to describe the disclosure in detail, in which the same components will be marked with the same symbols, and descriptions of the same technical content will be omitted. Please refer to the previous embodiments for the omitted parts, which will not be described again below.

Figure 3:
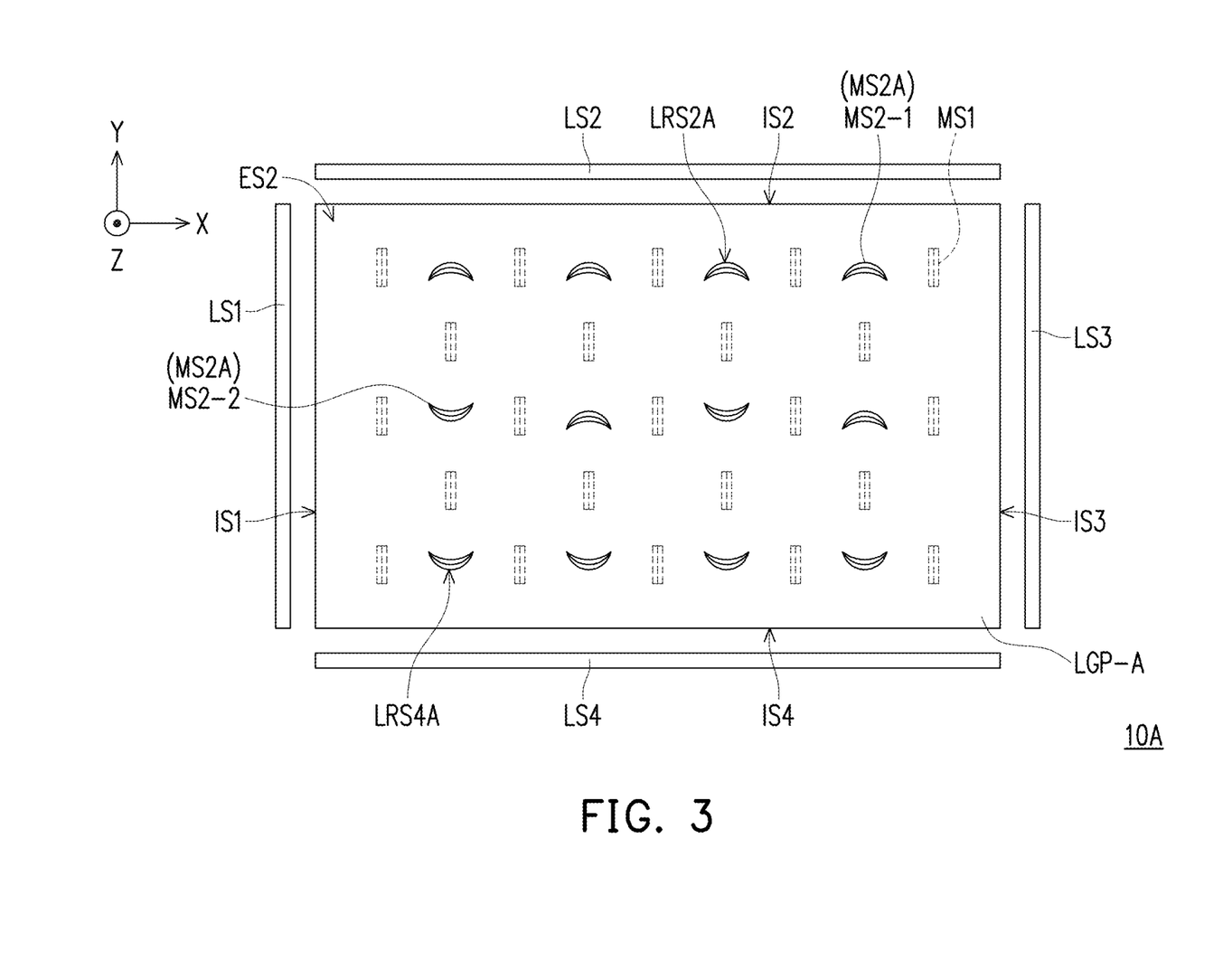
FIG. 3 is a schematic front view of a display apparatus according to a second embodiment of the disclosure.

FIG. 3 is a schematic front view of a display apparatus according to a second embodiment of the disclosure. Please refer to FIG. 3. The only difference between a display apparatus 10A of this embodiment and the display apparatus 10 of FIG. 1 is that the configuration of the second optical microstructure is different. For example, in this embodiment, a contour of orthographic projection of each of multiple second optical microstructures MS2A on the second light emitting surface ES2 of a light guide plate LGP-A on the second light emitting surface ES2 may be crescent-shaped.

More specifically, a light receiving surface of the second optical microstructure MS2A facing the corresponding light source has a profile protruding toward the light source. For example, in this embodiment, the second optical microstructures MS2A may be divided into a plurality of second optical microstructures MS2-1 disposed toward the second light source LS2 and a plurality of second optical microstructures MS2-2 disposed toward the fourth light source LS4. A second light receiving surface LRS2A of the second optical microstructure MS2-1 is convex toward the second light source LS2, and a fourth light receiving surface LRS4A of the second optical microstructures MS2-2 is convex toward the fourth light source LS4.

Through the design of crescent-shaped light receiving surfaces, the probability of the second light beams being reflected by the second optical microstructures MS2-2 and the probability of the fourth light beams being reflected by the second optical microstructures MS2-1 can be reduced. That is, the second optical microstructures MS2A can be prevented from reflecting the light beams emitted by the non-corresponding light source. It should be noted that the disclosure is not limited to the content disclosed in FIG. 3. In other embodiments, the number and arrangement of the second optical microstructures disposed respectively corresponding to the second light source LS2 and the fourth light source LS4 may be adjusted according to the actual illumination needs (such as light shape).

Figure 4:
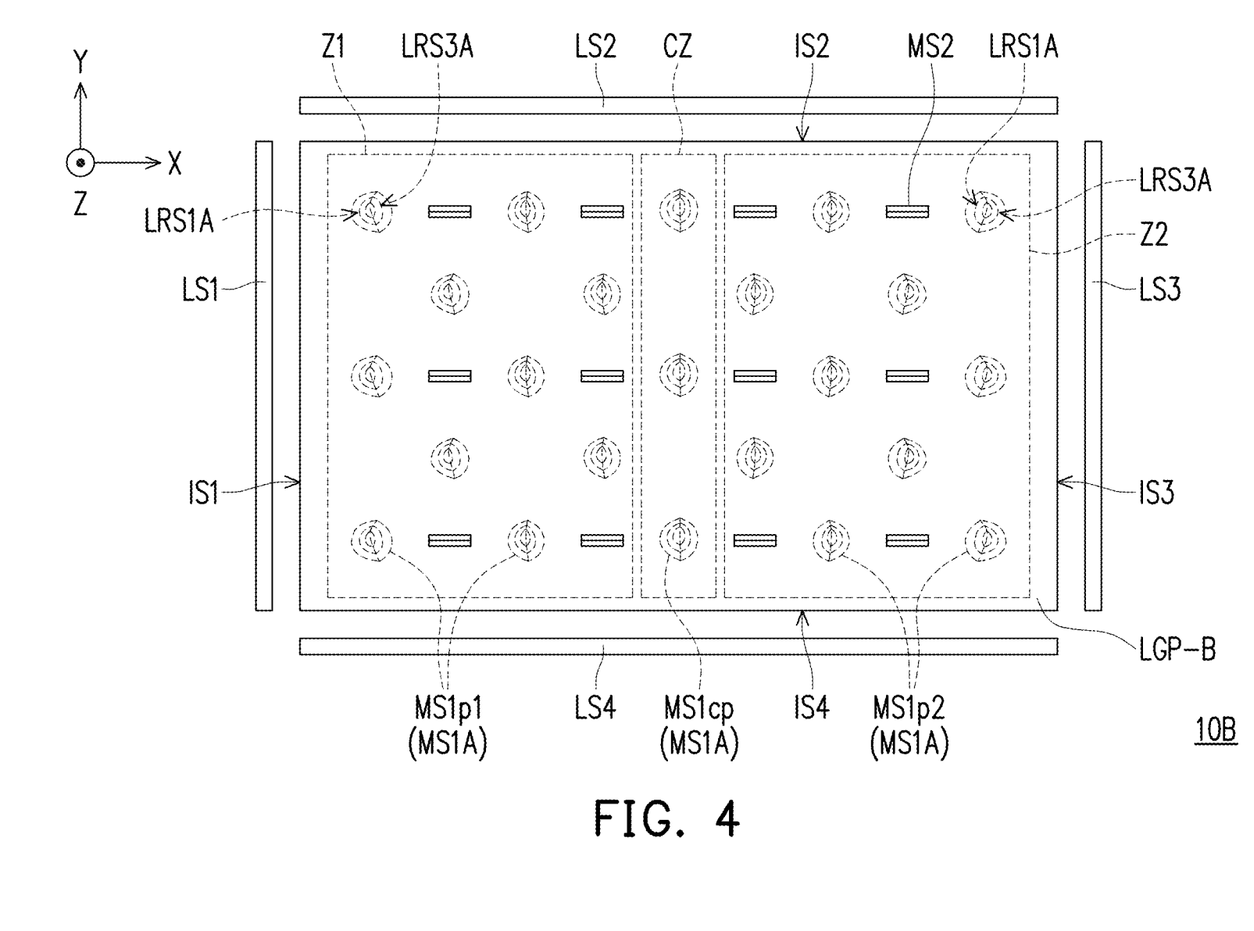
FIG. 4 is a schematic front view of a display apparatus according to a third embodiment of the disclosure.
Figure 5:
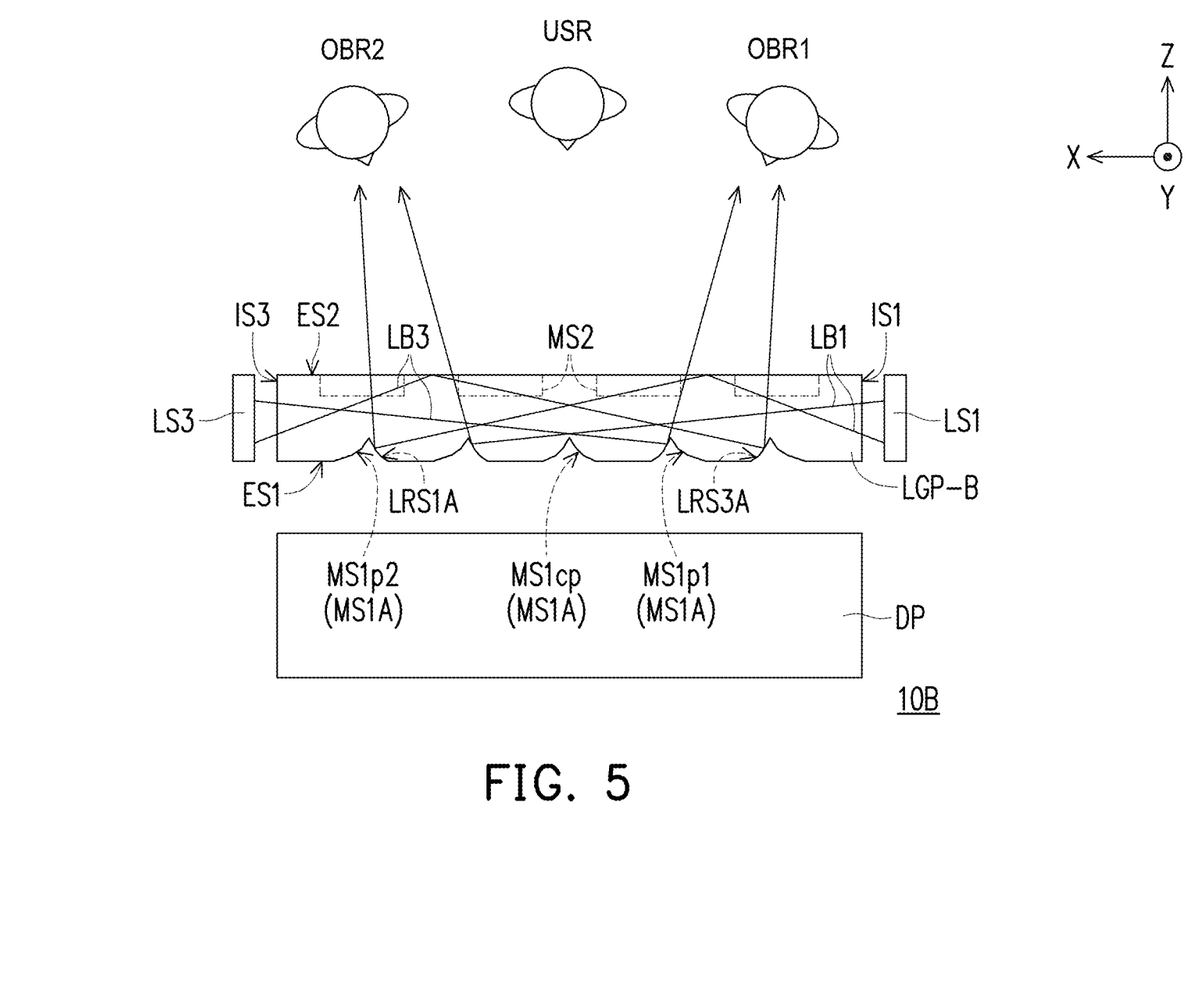
FIG. 5 is a schematic cross-sectional view of the display apparatus of FIG. 4.
Figure 6A:
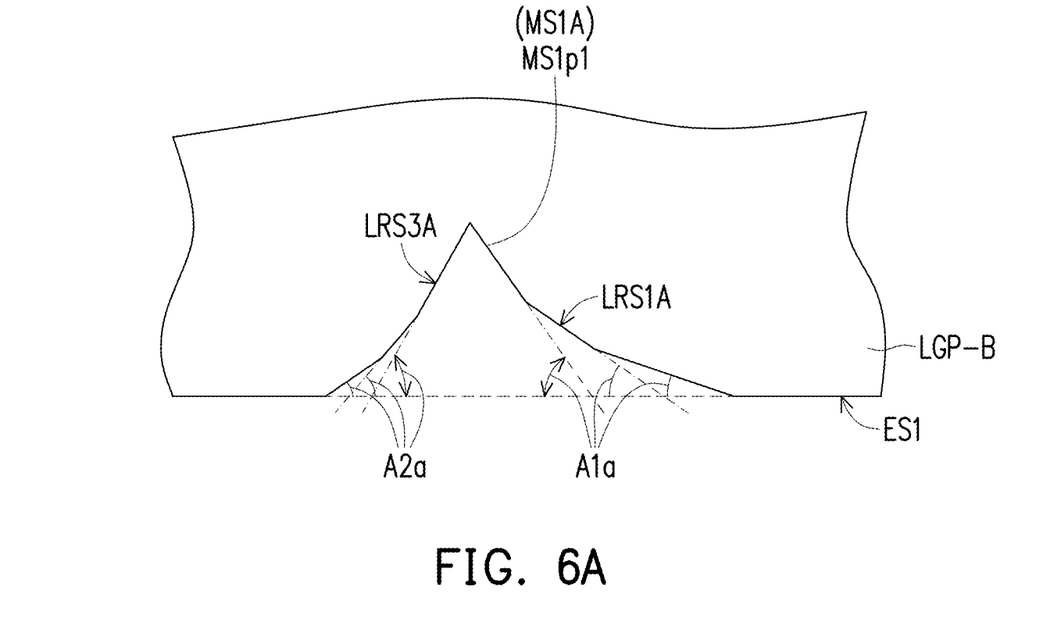
FIG. 6A to FIG. 6C are enlarged schematic views of a partial zone of the display apparatus of FIG. 5.
Figure 6B:
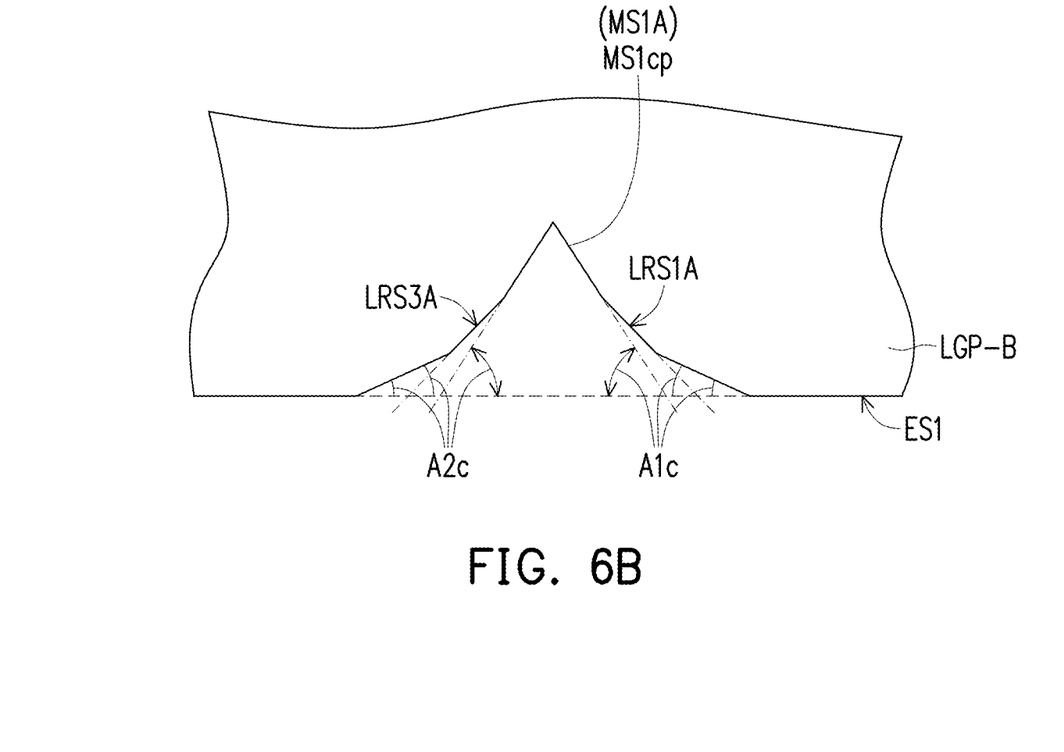
Figure 6C:
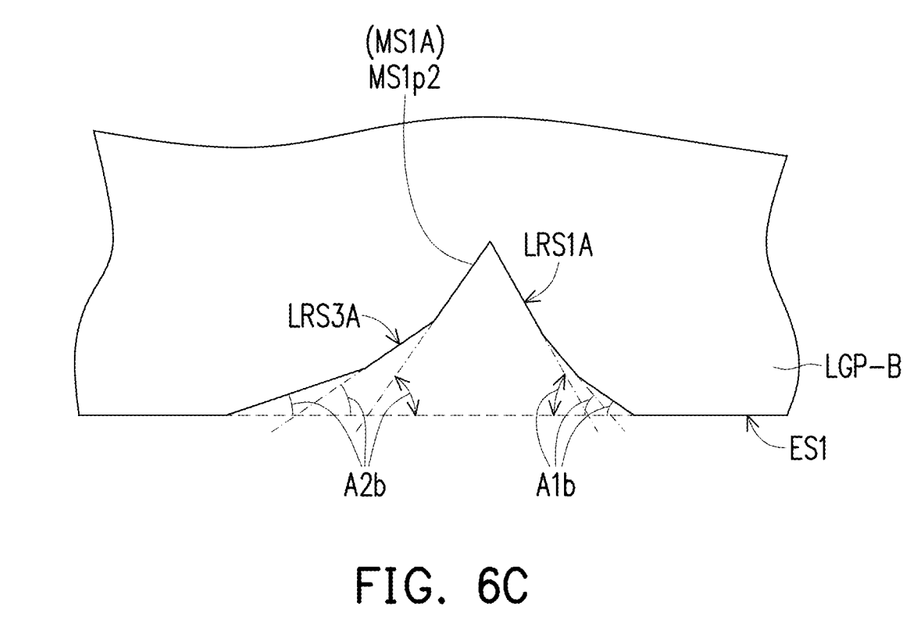

FIG. 4 is a schematic front view of a display apparatus according to a third embodiment of the disclosure. FIG. 5 is a schematic cross-sectional view of the display apparatus of FIG. 4. FIG. 6A to FIG. 6C are enlarged schematic views of a partial zone of the display apparatus of FIG. 5. Please refer to FIG. 4 and FIG. 5. The only difference between a display apparatus 10B of this embodiment and the display apparatus 10 of FIG. 1 is that the configuration of the first optical microstructure is different.

For example, in this embodiment, the first optical microstructures MS1A on the first light emitting surface ES1 of a light guide plate LGP-B is olive-shaped, which is different from the stripe-shaped first optical microstructures MS1 of FIG. 1. More specifically, a first included angle between a first light receiving surface LRS1A of the first optical microstructure MS1A and the first light emitting surface ES1 and a second included angle between a third light receiving surface LRS3A and the first light emitting surface ES1 gradually change as they move away from the first light emitting surface ES1.

As shown in FIG. 6A to FIG. 6C, the first included angle (such as a first included angle A1$a$, a first included angle A1$b$, or a first included angle A1$c$) between the first light receiving surface LRS1A of the first optical microstructure MS1A and the first light emitting surface ES1 gradually increases as it moves away from the first light emitting surface ES1. Similarly, the second included angle (such as a second included angle A2$a$, a second included angle A2$b$, or a second included angle A2$c$) between the third light receiving surface LRS3A of the first optical microstructure MS1A and the first light emitting surface ES1 gradually increases as it moves away from the first light emitting surface ES1. However, the disclosure is not limited thereto. In other embodiments not shown, the first included angle and the second included angle of the first optical microstructures may also gradually decrease as they move away from the first light emitting surface ES1. Specifically, in this embodiment, the first light receiving surface LRS1A is composed of multiple inclined surfaces with different slopes, and the third light receiving surface LRS3A is also composed of multiple inclined surfaces with different slopes. However, the disclosure is not limited thereto. In other embodiments, the first light receiving surface LRS1A may be a curved surface with different curvatures, and the third light receiving surface LRS3A may also be a curved surface with different curvatures.

Please continue to refer to FIG. 4 and FIG. 5. In this embodiment, the first light emitting surface ES1 of the light guide plate LGP-B may be divided into a central zone CZ, a first zone Z1, and a second zone Z2. The first zone Z1 is disposed between the central zone CZ and the first light incident surface IS1 along an arrangement direction (e.g. direction X) of the first light incident surface IS1 and the third light incident surface IS3. The second zone Z2 is disposed between the central zone CZ and the third light incident surface IS3 along the arrangement direction. That is, the first zone Z1 and the second zone Z2 are respectively disposed on opposite sides of the central zone CZ along the direction X. In this embodiment, the first optical microstructures MS1A include central portions MS1$cp$, first portions MS1$p$1, and second portions MS1$p$2 respectively located in the central zone CZ, the first zone Z1 and the second zone Z2.

Please refer to FIG. 6A to FIG. 6C at the same time. A minimum difference value between the first included angle A1$c$ and the second included angle A2$c$ of each of central portions MS1$cp$ of the first optical microstructures MS1A is less than a minimum difference value of the first included angle A1$a$ and the second included angle A2$a$ of each of first portions MS1$p$1, and a minimum difference value between the first included angle A1$c$ and the second included angle A2$c$ of each of central portions MS1$cp$ of the first optical microstructures MS1A is less than a minimum difference value between the first included angle A1$b$ and the second included angle A2$b$ of each of the second portions MS1$p$2. That is, compared with cross-sectional profiles of the first light receiving surface LRS1A and the third light receiving surface LRS3A of each of the central portions MS1$cp$ located in the central zone CZ, cross-sectional profiles of the first light receiving surface LRS1A and the third light receiving surface LRS3A of each of the first portions MS1$p$1 located in the first zone Z1 and cross-sectional profiles of the first light receiving surface LRS1A and the third light receiving surface LRS3A of each of the second portions MS1$p$2 located in the second zone Z2 are relatively asymmetric.

For example, in this embodiment, the minimum difference value between the first included angle A1$c$ and the second included angle A2$c$ of each of the central portions MS1$cp$ of the first optical microstructures MS1A is 0. More specifically, the cross-sectional profiles of the first light receiving surface LRS1A and the third light receiving surface LRS3A of each of the central portions MS1$cp$ may be symmetrically distributed (as shown in FIG. 6B). A maximum value of the first included angle A1$a$ of each of the first portions MS1$p$1 of the first optical microstructures MS1A is less than a maximum value of the second included angle A2$a$ (as shown in FIG. 6A). A maximum value of the second included angle A2$b$ of each of the second portions MS1$p$2 of the first optical microstructures MS1A is less than a maximum value of the first included angle A1$b$ (as shown in FIG. 6C). It should be understood that the maximum value of the first included angle A1$a$ refers to an angle value of the largest included angle among multiple first included angles A1$a$ of a single first optical microstructure MS1A, and similarly, the maximum value of the second included angle A2$a$ refers to an angle value of the largest included angle among multiple second included angles A2$a$ of a single first optical microstructure MS1A.

In other words, the slope change of the first light receiving surface LRS1A of each of the first portions MS1$p$1 as it moves away from the first light emitting surface ES1 is gentler than the slope change of the third light receiving surface LRS3A as it moves away from the first light emitting surface ES1, and the slope change of the third light receiving surface LRS3A of each of the second portions MS1$p$2 as it moves away from the first light emitting surface ES1 is gentler than the slope change of the first light receiving surface LRS1A as it moves away from the first light emitting surface ES1.

From another point of view, the maximum value of the first included angle A1$a$ of each of the first portions MS1$p$1 of the first optical microstructures MS1A is less than the maximum value of the first included angle A1$b$ of each of the second portions MS1$p$2, and the maximum value of the second included angle A2$b$ of each of the second portions MS1$p$2 is less than the maximum value of the second included angle A2$a$ of each of the first portions MS1$p$1.

It is particularly important to note that in this embodiment, the maximum value of the first included angle A1$a$ of each of the first portions MS1$p$1 in the first zone Z1 gradually increases as the disposed position is further away from the first light incident surface IS1, and the maximum value of the second included angle A2$b$ of each of the second portions MS1$p$2 in the second zone Z2 gradually increases as the disposed position is further away from the third light incident surface IS3. In other words, the minimum difference value between the first included angle A1$a$ and the second included angle A2$a$ of each of the first portions MS1$p$1 gradually decreases as the disposed position approaches the central zone CZ, the minimum difference value between the first included angle A1$b$ and the second included angle A2$b$ of each of the second portions MS1$p$2 gradually decreases as the disposed position approaches the central zone CZ.

Through the distribution with gradual change of the first included angle (i.e. the included angle between the first light receiving surface LRS1A and the first light emitting surface ES1) and the second included angle (i.e. the included angle between the third light receiving surface LRS3A and the first light emitting surface ES1) of the first optical microstructures MS1A in the direction X, the light concentration of the light beams emitted by the first light source LS1 and the third light source LS3 in the spaces of the bystanders OBR1 and OBR2 can be increased. This helps to improve the anti-peep effect for the bystanders when the display apparatus 10B is operated in the anti-peep mode and improve the display quality for the user USR, and further avoids a slight decrease in screen brightness and interference on the left and right sides of the screen due to the first optical microstructures having a fixed angle of the first included angles and the second included angles.

To sum up, in the display apparatus according to an embodiment of the disclosure, the light guide plate has the first light emitting surface and the second light emitting surface that face away from each other. The display panel is provided on the side of the first light emitting surface of the light guide plate. The second optical microstructures disposed on the second light emitting surface reflect the second light beams entering the light guide plate through the second light incident surface such that they pass through the first light emitting surface and irradiate the display surface of the display panel to serve as a light source of illumination when the display apparatus displays. The first optical microstructures disposed on the first light emitting surface reflect the first light beams entering the light guide plate through the first light incident surface such that they pass through the second light emitting surface and are projected within a specific angle range in the use space to serve as an interference light source during the anti-peep display of the display apparatus. By integrating the optical microstructures with these two functions on the same light guide plate, at least one of the following advantages is achieved: in addition to significantly reducing the overall thickness of the display apparatus, it can also prevent the display efficiency of the display apparatus from being reduced due to the addition of extra light guide plates.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Thus, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A reflective display apparatus, comprising:
   a light guide plate, having a first light incident surface, a second light incident surface, a first light emitting surface, and a second light emitting surface, the first light incident surface connected to the second light incident surface, the first light emitting surface, and the second light emitting surface, and the first light emitting surface facing away from the second light emitting surface;
   a first light source, disposed on a side of the first light incident surface of the light guide plate and emitting a plurality of first light beams toward the first light incident surface, the first light beams entering the light guide plate through the first light incident surface;
   a second light source, disposed on a side of the second light incident surface of the light guide plate and emitting a plurality of second light beams toward the second light incident surface, the second light beams entering the light guide plate through the second light incident surface;
   a plurality of first optical microstructures, disposed on the first light emitting surface of the light guide plate and each having a first light receiving surface facing the first light source;
   a plurality of second optical microstructures, disposed on the second light emitting surface of the light guide plate and each having a second light receiving surface facing the second light source; and
   a reflective display panel, disposed on a side of the first light emitting surface of the light guide plate and overlapping the first light emitting surface,
   wherein the second light beams pass through the first light emitting surface and irradiate a display surface of the reflective display panel after being reflected by a plurality of the second light receiving surfaces of the second optical microstructures, and the first light beams pass through the second light emitting surface and exit the reflective display apparatus after being reflected by a plurality of the first light receiving surfaces of the first optical microstructures.

2. The reflective display apparatus according to claim 1, wherein the first light incident surface is perpendicular to the second light incident surface.

3. The reflective display apparatus according to claim 1, wherein the light guide plate further has a third light incident surface, the third light incident surface connected to the second light incident surface and opposite to the first light incident surface, and the reflective display apparatus further comprises:
   a third light source, disposed on a side of the third light incident surface of the light guide plate and emitting a plurality of third light beams toward the third light incident surface, the third light beams entering the light guide plate through the third light incident surface,
   wherein each of the first optical microstructures further has a third light receiving surface facing the third light source, and the third light beams pass through the second light emitting surface and exit the reflective display apparatus after being reflected by a plurality of the third light receiving surfaces of the first optical microstructures.

4. The reflective display apparatus according to claim 3, wherein there is a first included angle between the first light receiving surface of each of the first optical microstructures and the first light emitting surface, there is a second included angle between the third light receiving surface of each of the first optical microstructures and the first light emitting surface, and the first included angle and the second included angle of each of the first optical microstructures gradually change as they move away from the first light emitting surface.

5. The reflective display apparatus according to claim 4, wherein the light guide plate further has a central zone, a first zone, and a second zone; the first zone is disposed between the central zone and the first light incident surface along an arrangement direction of the first light incident surface and the third light incident surface; the second zone is disposed between the central zone and the third light incident surface along the arrangement direction; the first optical microstructures include central portions, first portions, and second portions respectively located in the central zone, the first zone, and the second zone; and a minimum difference value between the first included angle and the second included angle of each of the central portions of the first optical microstructures is less than a minimum difference value between the first included angle and the second included angle of each of the first portions or the second portions of the first optical microstructures.

6. The reflective display apparatus according to claim 5, wherein the minimum difference value between the first included angle and the second included angle of the each of the central portions of the first optical microstructures is 0.

7. The reflective display apparatus according to claim 4, wherein the light guide plate further has a first zone and a second zone; the first zone is disposed between the second zone and the first light incident surface along an arrangement direction of the first light incident surface and the third light incident surface; the second zone is disposed between the first zone and the third light incident surface along the arrangement direction; the first optical microstructures include first portions and second portions respectively located in the first zone and the second zone; a maximum value of the first included angle of each of the first portions of the first optical microstructures is less than a maximum value of the first included angle of each of the second portions of the first optical microstructures; and a maximum value of the second included angle of each of the second portions of the first optical microstructures is less than a maximum value of the second included angle of each of the first portions of the first optical microstructures.

8. The reflective display apparatus according to claim 4, wherein the light guide plate further has a first zone and a second zone; the first zone is disposed between the second zone and the first light incident surface along an arrangement direction of the first light incident surface and the third light incident surface; the second zone is disposed between the first zone and the third light incident surface along the arrangement direction; the first optical microstructures include first portions and second portions respectively located in the first zone and the second zone; a maximum value of the first included angle of each of the first portions of the first optical microstructures is less than a maximum value of the second included angle; and a maximum value of the second included angle of each of the second portions of the first optical microstructures is less than a maximum value of the first included angle.

9. The reflective display apparatus according to claim 1, wherein a contour of orthographic projection of each of the second optical microstructures on the second light emitting surface is crescent-shaped.

10. The reflective display apparatus according to claim 1, wherein the light guide plate further has a fourth light incident surface, the fourth light incident surface connected to the first light incident surface and opposite to the second light incident surface, and the reflective display apparatus further comprises:
    a fourth light source, disposed on a side of the fourth light incident surface of the light guide plate and emitting a plurality of fourth light beams toward the fourth light incident surface, the fourth light beams entering the light guide plate through the fourth light incident surface,
wherein each of the second optical microstructures further has a fourth light receiving surface facing the fourth light source, and the fourth light beams pass through the first light emitting surface and irradiate the display surface of the reflective display panel after being reflected by a plurality of the fourth light receiving surfaces of the second optical microstructures.

\* \* \* \* \*